Figure 1:
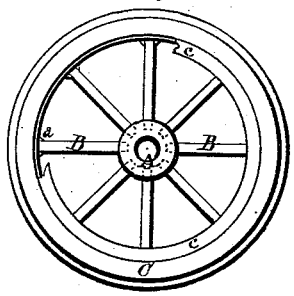
Figure 2:
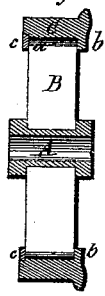

A. D. GRIFFIN.
Car-Wheel for Tram-Roads.

No. 161,223. Patented March 23, 1875.

WITNESSES.

INVENTOR.
Archibald D. Griffin
per F. A. Lehmann
att'y

UNITED STATES PATENT OFFICE.

ARCHIBALD D. GRIFFIN, OF HOPEWELL, PENNSYLVANIA.

IMPROVEMENT IN CAR-WHEEELS FOR TRAM-ROADS.

Specification forming part of Letters Patent No. 161,223, dated March 23, 1875; application filed February 13, 1875.

*To all whom it may concern:*

Be it known that I, ARCHIBALD D. GRIFFIN, of Hopewell, in the county of Bedford and State of Pennsylvania, have invented certain new and useful Improvements in Car-Wheels for Tram-Roads; and I do hereby declare the following to be a full, clear, and exact description of the invention, such as will enable others skilled in the art to which it pertains to make and use it, reference being had to the accompanying drawings, which form part of this specification.

My invention relates to an improvement in car-wheel for tram-roads; and consists in the arrangement and combination of parts by which a greater strength and durability are obtained, as will be more fully described hereafter.

The accompanying drawings represent my invention.

A represents the hub of the wheel; B, the spokes, and C the rim or tread. The hub A is cast of soft iron, so that it may be bored out and finished on a lathe. The object in using soft iron instead of hard, as is customary, is to unite with great strength a degree of durability not obtainable for chilled hubs. The spokes B, made of wrought-iron, combine such elasticity with strength as is not to be found in spokes of cast-iron, however good the material of which they are made. The spokes are inserted in the hub, and both hub and spokes being of soft iron can be secured together without losing any of their elasticity or jarring against one another, by which the spokes would wear loose in their sockets. The rim or tread C of the wheel is cast in sand, without a chill, of hard white iron, to withstand the wear on the track. The wrought-iron spokes are secured to the inside of the rim in tight-fitting grooves *a*, and rest against a flange, *b*, on the outside of the rim, where they are held in place by a ring, *c*, which takes the place of a flange on the inside, and is flush with the rim.

The wheel thus constructed possesses qualities which cannot be found in cast-iron wheels, because the latter, being of the same material throughout, do not combine the various degrees of strength and elasticity of wrought-iron with the hard face of the tread and the soft-iron hubs, to sustain the concussions to which wheels on tram-roads are constantly subjected. Experience has taught that it requires the combined qualities of all three to stand the wear and tear of tram-roads, and no cast-iron wheel, whether cast in one piece or in many, has given satisfaction.

Heretofore it has been customary to use bolts to connect different parts of the wheel, but this has proved a failure; therefore I have discarded them altogether, and construct a wheel the parts of which do not require to be bolted, but are as compact as if they were cast in one piece, offering all the advantages sought after in casting the parts separately, with the addition of the advantages of a graded elasticity, strength, and durability united, to suit the demands made upon tram-wheels.

I am aware that a wheel in which the rim and hub are made separately of cast-iron and the spokes of wrought-iron, is not new; and this I disclaim.

Having thus described my invention, I claim—

1. The combination of a soft-iron hub A, wrought-iron spokes B, and a rim or tread, C, cast of hard white iron without a chill, substantially as set forth.

2. The combination of the soft-iron hub A, spokes B, rim C, and ring *c*, whereby the spokes are secured in position without the use of bolts, substantially as set forth.

In testimony that I claim the foregoing I have hereunto set my hand this 10th day of February, 1875.

ARCHIBALD D. GRIFFIN.

Witnesses:
 D. M. PAINTER,
 WM. SLEEP.